(12) United States Patent
Agashe (10) Patent No.: US 9,746,590 B2
(45) Date of Patent: Aug. 29, 2017

(54) RETROREFLECTIVE SHEETING HAVING A HALFTONE PRINTED FRONT SURFACE

(71) Applicant: Avery Dennison Corporation, Pasadena, CA (US)

(72) Inventor: Nikhil Agashe, Chicago, IL (US)

(73) Assignee: Avery Dennison Corporation, Glendale, CA (US)

( * ) Notice: Subject to any disclaimer, the term of this patent is extended or adjusted under 35 U.S.C. 154(b) by 660 days.

(21) Appl. No.: 13/655,660

(22) Filed: Oct. 19, 2012

(65) Prior Publication Data

US 2013/0100532 A1    Apr. 25, 2013

Related U.S. Application Data

(60) Provisional application No. 61/548,777, filed on Oct. 19, 2011.

(51) Int. Cl.
*G02B 5/124* (2006.01)
*G02B 5/128* (2006.01)

(52) U.S. Cl.
CPC ............ *G02B 5/124* (2013.01); *G02B 5/128* (2013.01)

(58) Field of Classification Search
CPC ...... G02B 5/124; G02B 5/128; G02B 6/0036; H04N 1/6058; H04N 1/40018;
(Continued)

(56) References Cited

U.S. PATENT DOCUMENTS

| 3,430,375 A | 3/1969 | Altman |
| 4,708,920 A | 11/1987 | Orensteen |

(Continued)

FOREIGN PATENT DOCUMENTS

| JP | 2002-149095 | 5/2002 |
| JP | 2003-531396 | 10/2003 |

(Continued)

OTHER PUBLICATIONS

International Search Report and Written Opinion issued in corresponding IA No. PCT/US2012/060961 dated Jan. 8, 2013.

(Continued)

*Primary Examiner* — James Phan
(74) *Attorney, Agent, or Firm* — Avery Dennison Corporation (57) ABSTRACT

A printed retroreflective film has a planar surface on a front side and a plurality of retroreflective elements on a back side. A halftone printed ink layer is deposited on the planar surface formed from uniformly spaced, discrete dots of deposited ink. The areas between the dots provide light-transmissive openings that receive incident light and transmit retroreflected light. The aggregate area of the dots forming the half-tone pattern preferably covers between about 60% and 90% of the area of the half-tone pattern. The use of such a halftone pattern of ink increases the reflectivity of the printed retroreflective sheeting by reducing the amount of light absorbed by the ink, and by reducing the amount of light scattered by the layer of ink. The use of such a halftone pattern of ink further obviates the need for an anti-light scattering topcoat or film over the front surface of the retroreflective sheet.

21 Claims, 11 Drawing Sheets

(58) Field of Classification Search
CPC ... H04N 1/6038; H04N 1/6041; B41J 2/2146; B41J 2029/3935; B41J 2/2107; B41J 3/407; B32B 7/02; G09F 13/16
USPC .................................. 359/546–552, 529–542
See application file for complete search history.

(56) References Cited

U.S. PATENT DOCUMENTS

| | | | | |
|---|---|---|---|---|
| 6,024,455 | A | * | 2/2000 | O'Neill .................. G02B 5/124 283/85 |
| 6,506,475 | B1 | * | 1/2003 | Hill .......................... B41M 1/18 156/107 |
| 2009/0097114 | A1 | | 4/2009 | Mimura et al. |

FOREIGN PATENT DOCUMENTS

| | | |
|---|---|---|
| NZ | 521798 | 3/2004 |
| WO | 01/79897 | 10/2001 |
| WO | 2010/077475 | 7/2010 |
| WO | 2011/046957 | 4/2011 |

OTHER PUBLICATIONS

International Preliminary Report on Patentability issued in corresponding IA No. PCT/US2012/060961 dated May 1, 2014.

\* cited by examiner

|  | 30/0.1 | 30/0.2 | 30/0.333 | 30/0.5 | 30/1.0 | 30/1.5 | 30/2.0 | 30/0.1 Spec | 30/0.2 Spec | 30/0.333 Spec | 30/0.5 Spec |
|---|---|---|---|---|---|---|---|---|---|---|---|
| 30° Spec | 20.0 | 14.0 | 8.0 | 6.0 | | | | | | | |
| 100 | 8.779 | 6.708 | 6.101 | 5.238 | 3.523 | 2.154 | 1.4 | 32 | 25 | 12 | 10 |
| 99 | 9.657 | 7.312 | 6.712 | 5.837 | 4.338 | 2.745 | 1.7 | 32 | 25 | 12 | 10 |
| 98 | 7.904 | 6.030 | 5.567 | 4.743 | 3.205 | 1.959 | 1.2 | 32 | 25 | 12 | 10 |
| 97 | 9.770 | 7.360 | 6.650 | 5.868 | 4.205 | 2.594 | 1.7 | 32 | 25 | 12 | 10 |
| 96 | 7.796 | 5.854 | 5.382 | 4.576 | 3.199 | 1.964 | 1.2 | 32 | 25 | 12 | 10 |
| 95 | 9.116 | 6.856 | 6.223 | 5.317 | 3.811 | 2.382 | 1.5 | 32 | 25 | 12 | 10 |
| 94 | 10.042 | 7.623 | 6.919 | 5.875 | 4.247 | 2.568 | 1.6 | 32 | 25 | 12 | 10 |
| 93 | 9.617 | 7.305 | 6.610 | 5.638 | 4.067 | 2.510 | 1.6 | 32 | 25 | 12 | 10 |
| 92 | 8.413 | 6.389 | 5.803 | 4.847 | 3.225 | 1.981 | 1.3 | 32 | 25 | 12 | 10 |
| 91 | 11.649 | 8.651 | 7.687 | 6.722 | 4.799 | 2.908 | 1.8 | 32 | 25 | 12 | 10 |
| 90 | 9.422 | 7.146 | 6.447 | 5.364 | 3.463 | 2.063 | 1.3 | 32 | 25 | 12 | 10 |
| 89 | 10.779 | 8.177 | 7.228 | 5.811 | 3.535 | 1.999 | 1.2 | 32 | 25 | 12 | 10 |
| 88 | 12.829 | 8.885 | 7.955 | 7.392 | 4.224 | 2.307 | 1.3 | 32 | 25 | 12 | 10 |
| 87 | 11.161 | 8.006 | 7.200 | 6.421 | 3.781 | 2.062 | 1.2 | 32 | 25 | 12 | 10 |
| 86 | 10.886 | 7.777 | 6.955 | 6.243 | 3.721 | 2.056 | 1.2 | 32 | 25 | 12 | 10 |
| 85 | 10.117 | 7.292 | 6.487 | 5.792 | 3.503 | 1.987 | 1.1 | 32 | 25 | 12 | 10 |
| 84 | 10.267 | 7.446 | 6.732 | 5.991 | 3.551 | 2.010 | 1.2 | 32 | 25 | 12 | 10 |
| 83 | 11.774 | 8.256 | 7.443 | 6.877 | 4.029 | 2.192 | 1.2 | 32 | 25 | 12 | 10 |
| 82 | 11.872 | 8.366 | 7.551 | 7.039 | 4.131 | 2.272 | 1.3 | 32 | 25 | 12 | 10 |
| 81 | 9.081 | 6.698 | 5.979 | 5.282 | 3.296 | 1.941 | 1.2 | 32 | 25 | 12 | 10 |
| 80 | 9.825 | 7.414 | 6.614 | 5.455 | 3.418 | 1.924 | 1.1 | 32 | 25 | 12 | 10 |
| 79 | 17.038 | 12.424 | 10.702 | 9.355 | 4.783 | 2.404 | 1.3 | 32 | 25 | 12 | 10 |
| 78 | 15.069 | 10.819 | 9.327 | 8.218 | 4.281 | 2.168 | 1.1 | 32 | 25 | 12 | 10 |
| 77 | 15.623 | 11.803 | 10.015 | 8.296 | 4.205 | 2.112 | 1.2 | 32 | 25 | 12 | 10 |
| 76 | 19.178 | 14.417 | 12.068 | 10.052 | 4.990 | 2.439 | 1.3 | 32 | 25 | 12 | 10 |
| 75 | 21.787 | 16.002 | 13.339 | 11.492 | 5.532 | 2.670 | 1.4 | 32 | 25 | 12 | 10 |
| 74 | 18.865 | 14.755 | 12.264 | 9.711 | 4.514 | 2.215 | 1.2 | 32 | 25 | 12 | 10 |
| 73 | 22.308 | 17.034 | 13.983 | 11.403 | 5.310 | 2.581 | 1.4 | 32 | 25 | 12 | 10 |
| 72 | 23.179 | 18.293 | 14.962 | 11.740 | 5.078 | 2.411 | 1.3 | 32 | 25 | 12 | 10 |
| 71 | 26.430 | 20.375 | 16.433 | 13.323 | 5.592 | 2.566 | 1.4 | 32 | 25 | 12 | 10 |
| 70 | 25.962 | 20.653 | 16.757 | 12.982 | 5.248 | 2.471 | 1.4 | 32 | 25 | 12 | 10 |
| 69 | 24.185 | 17.802 | 14.688 | 12.663 | 5.685 | 2.762 | 1.5 | 32 | 25 | 12 | 10 |
| 68 | 18.365 | 14.409 | 11.876 | 9.396 | 4.342 | 2.178 | 1.2 | 32 | 25 | 12 | 10 |
| 67 | 22.567 | 17.777 | 14.581 | 11.414 | 5.086 | 2.519 | 1.4 | 32 | 25 | 12 | 10 |
| 66 | 24.780 | 19.007 | 15.347 | 12.513 | 5.569 | 2.737 | 1.5 | 32 | 25 | 12 | 10 |
| 65 | 25.495 | 20.135 | 16.336 | 12.859 | 5.458 | 2.658 | 1.5 | 32 | 25 | 12 | 10 |
| 64 | 27.292 | 21.520 | 17.482 | 13.767 | 5.784 | 2.863 | 1.6 | 32 | 25 | 12 | 10 |
| 63 | 27.880 | 21.744 | 17.330 | 13.819 | 5.694 | 2.703 | 1.5 | 32 | 25 | 12 | 10 |
| 62 | 29.521 | 23.330 | 18.469 | 14.338 | 5.672 | 2.686 | 1.5 | 32 | 25 | 12 | 10 |
| 61 | 35.475 | 27.599 | 21.893 | 17.650 | 6.721 | 3.079 | 1.7 | 32 | 25 | 12 | 10 |
| 60 | 30.771 | 24.523 | 19.480 | 15.139 | 5.772 | 2.641 | 1.5 | 32 | 25 | 12 | 10 |

|     | -4/0.1 | -4/0.2 | -4/0.333 | -4/0.5 | -4/1.0 | -4/1.5 | -4/2.0 | -4/0.1 | -4/0.2 | -4/0.5 |
|-----|--------|--------|----------|--------|--------|--------|--------|--------|--------|--------|
| -4 Spec | 42 | 30 |  | 13 |  |  |  | Spec | Spec | Spec |
| 100 | 49.2 | 29.6 | 31.7 | 34.6 | 19.1 | 9.7 | 4.9 | 70.0 | 50.0 | 21.0 |
| 99  | 48.7 | 29.2 | 31.2 | 34.0 | 18.9 | 9.8 | 5.0 | 70.0 | 50.0 | 21.0 |
| 98  | 47.3 | 28.4 | 30.4 | 32.9 | 18.5 | 9.6 | 4.8 | 70.0 | 50.0 | 21.0 |
| 97  | 48.0 | 28.8 | 30.7 | 33.4 | 18.6 | 9.6 | 4.9 | 70.0 | 50.0 | 21.0 |
| 96  | 46.8 | 28.1 | 29.8 | 32.3 | 18.0 | 9.3 | 4.8 | 70.0 | 50.0 | 21.0 |
| 95  | 46.9 | 28.3 | 29.9 | 32.2 | 17.8 | 9.1 | 4.5 | 70.0 | 50.0 | 21.0 |
| 94  | 48.2 | 28.9 | 30.5 | 32.9 | 18.2 | 9.2 | 4.6 | 70.0 | 50.0 | 21.0 |
| 93  | 47.3 | 28.3 | 29.7 | 32.1 | 17.5 | 8.8 | 4.4 | 70.0 | 50.0 | 21.0 |
| 92  | 48.3 | 29.0 | 30.4 | 32.7 | 17.6 | 8.7 | 4.3 | 70.0 | 50.0 | 21.0 |
| 91  | 46.6 | 28.1 | 29.2 | 31.4 | 16.9 | 8.4 | 4.2 | 70.0 | 50.0 | 21.0 |
| 90  | 51.9 | 31.1 | 32.1 | 34.4 | 18.0 | 8.9 | 4.4 | 70.0 | 50.0 | 21.0 |
| 89  | 58.0 | 34.4 | 34.4 | 36.4 | 17.4 | 7.9 | 3.8 | 70.0 | 50.0 | 21.0 |
| 88  | 55.3 | 32.8 | 32.9 | 35.1 | 16.9 | 7.8 | 3.7 | 70.0 | 50.0 | 21.0 |
| 87  | 53.1 | 31.6 | 31.7 | 33.9 | 16.3 | 7.6 | 3.7 | 70.0 | 50.0 | 21.0 |
| 86  | 54.6 | 32.4 | 32.9 | 35.0 | 17.3 | 8.0 | 3.9 | 70.0 | 50.0 | 21.0 |
| 85  | 55.1 | 32.7 | 33.1 | 35.3 | 17.0 | 7.9 | 3.8 | 70.0 | 50.0 | 21.0 |
| 84  | 54.2 | 32.1 | 32.7 | 34.9 | 17.1 | 8.0 | 3.9 | 70.0 | 50.0 | 21.0 |
| 83  | 53.5 | 31.7 | 32.3 | 34.5 | 17.1 | 8.0 | 3.9 | 70.0 | 50.0 | 21.0 |
| 82  | 54.8 | 32.6 | 33.2 | 35.5 | 17.4 | 8.1 | 4.0 | 70.0 | 50.0 | 21.0 |
| 81  | 56.8 | 33.9 | 34.4 | 36.9 | 18.3 | 8.5 | 4.0 | 70.0 | 50.0 | 21.0 |
| 80  | 57.8 | 34.3 | 34.6 | 37.0 | 17.7 | 7.8 | 3.7 | 70.0 | 50.0 | 21.0 |
| 79  | 75.9 | 44.9 | 41.8 | 43.8 | 17.7 | 7.2 | 3.5 | 70.0 | 50.0 | 21.0 |
| 78  | 69.5 | 40.9 | 38.5 | 40.4 | 16.7 | 6.8 | 3.2 | 70.0 | 50.0 | 21.0 |
| 77  | 76.2 | 45.3 | 41.7 | 43.9 | 17.6 | 7.1 | 3.3 | 70.0 | 50.0 | 21.0 |
| 76  | 93.3 | 55.8 | 49.4 | 51.9 | 19.3 | 7.5 | 3.5 | 70.0 | 50.0 | 21.0 |
| 75  | 94.2 | 55.9 | 49.6 | 52.2 | 19.1 | 7.6 | 3.6 | 70.0 | 50.0 | 21.0 |
| 74  | 100.2 | 59.5 | 51.9 | 54.8 | 19.4 | 7.7 | 3.7 | 70.0 | 50.0 | 21.0 |
| 73  | 110.9 | 66.0 | 56.6 | 59.7 | 20.8 | 7.9 | 3.7 | 70.0 | 50.0 | 21.0 |
| 72  | 113.1 | 68.9 | 58.0 | 60.5 | 20.8 | 8.0 | 3.8 | 70.0 | 50.0 | 21.0 |
| 71  | 118.6 | 71.9 | 59.8 | 62.5 | 20.6 | 7.8 | 3.7 | 70.0 | 50.0 | 21.0 |
| 70  | 125.0 | 74.8 | 63.1 | 66.4 | 20.7 | 7.9 | 3.8 | 70.0 | 50.0 | 21.0 |
| 69  | 97.7 | 58.7 | 51.2 | 53.9 | 19.8 | 8.2 | 4.0 | 70.0 | 50.0 | 21.0 |
| 68  | 88.8 | 53.8 | 46.8 | 48.5 | 18.2 | 7.5 | 3.7 | 70.0 | 50.0 | 21.0 |
| 67  | 81.4 | 50.2 | 43.1 | 43.9 | 16.2 | 6.8 | 3.3 | 70.0 | 50.0 | 21.0 |
| 66  | 103.0 | 62.5 | 53.2 | 55.1 | 19.4 | 8.1 | 4.0 | 70.0 | 50.0 | 21.0 |
| 65  | 116.2 | 70.1 | 59.1 | 61.9 | 20.6 | 8.4 | 4.1 | 70.0 | 50.0 | 21.0 |
| 64  | 109.0 | 65.7 | 55.3 | 57.5 | 18.8 | 7.6 | 3.7 | 70.0 | 50.0 | 21.0 |
| 63  | 128.8 | 76.4 | 63.5 | 67.0 | 21.3 | 8.4 | 4.1 | 70.0 | 50.0 | 21.0 |
| 62  | 132.7 | 79.7 | 65.7 | 69.5 | 21.5 | 8.3 | 4.0 | 70.0 | 50.0 | 21.0 |
| 61  | 143.0 | 86.1 | 70.2 | 74.1 | 22.6 | 8.6 | 4.2 | 70.0 | 50.0 | 21.0 |
| 60  | 138.0 | 81.7 | 66.8 | 70.1 | 21.2 | 7.9 | 3.8 | 70.0 | 50.0 | 21.0 |

| 30° Spec | 30/0.1 | 30/0.2 | 30/0.333 | 30/0.5 | 30/1.0 | 30/1.5 | 30/2.0 | 30/0.1 Spec | 30/0.2 Spec | 30/0.333 Spec | 30/0.5 Spec |
|---|---|---|---|---|---|---|---|---|---|---|---|
| | 20.0 | 14.0 | 8.0 | 6.0 | | | | | | | |
| 100 | 3.900 | 2.758 | 2.680 | 2.403 | 1.656 | 0.940 | 0.6 | 20.0 | 14.0 | 8.0 | 6 |
| 99 | 3.862 | 2.727 | 2.640 | 2.371 | 1.608 | 0.900 | 0.6 | 20.0 | 14.0 | 8.0 | 6 |
| 98 | 3.787 | 2.723 | 2.659 | 2.323 | 1.625 | 0.912 | 0.6 | 20.0 | 14.0 | 8.0 | 6 |
| 97 | 3.822 | 2.745 | 2.632 | 2.242 | 1.506 | 0.809 | 0.5 | 20.0 | 14.0 | 8.0 | 6 |
| 96 | 3.622 | 2.615 | 2.545 | 2.187 | 1.518 | 0.834 | 0.5 | 20.0 | 14.0 | 8.0 | 6 |
| 95 | 3.716 | 2.668 | 2.616 | 2.195 | 1.524 | 0.828 | 0.5 | 20.0 | 14.0 | 8.0 | 6 |
| 94 | 4.044 | 2.874 | 2.705 | 2.340 | 1.575 | 0.835 | 0.5 | 20.0 | 14.0 | 8.0 | 6 |
| 93 | 3.571 | 2.485 | 2.399 | 2.063 | 1.372 | 0.752 | 0.5 | 20.0 | 14.0 | 8.0 | 6 |
| 92 | 3.773 | 2.681 | 2.553 | 2.160 | 1.411 | 0.774 | 0.5 | 20.0 | 14.0 | 8.0 | 6 |
| 91 | 4.350 | 3.159 | 2.972 | 2.503 | 1.649 | 0.882 | 0.5 | 20.0 | 14.0 | 8.0 | 6 |
| 90 | 4.177 | 2.993 | 2.856 | 2.369 | 1.601 | 0.863 | 0.5 | 20.0 | 14.0 | 8.0 | 6 |
| 89 | 3.877 | 2.745 | 2.624 | 2.151 | 1.371 | 0.750 | 0.5 | 20.0 | 14.0 | 8.0 | 6 |
| 88 | 3.633 | 2.550 | 2.490 | 2.112 | 1.314 | 0.747 | 0.5 | 20.0 | 14.0 | 8.0 | 6 |
| 87 | 4.031 | 2.866 | 2.730 | 2.196 | 1.358 | 0.739 | 0.4 | 20.0 | 14.0 | 8.0 | 6 |
| 86 | 3.961 | 2.820 | 2.665 | 2.192 | 1.341 | 0.722 | 0.4 | 20.0 | 14.0 | 8.0 | 6 |
| 85 | 3.849 | 2.761 | 2.645 | 2.100 | 1.290 | 0.692 | 0.4 | 20.0 | 14.0 | 8.0 | 6 |
| 84 | 4.783 | 3.476 | 3.158 | 2.605 | 1.666 | 0.867 | 0.5 | 20.0 | 14.0 | 8.0 | 6 |
| 83 | 4.656 | 3.348 | 3.070 | 2.503 | 1.616 | 0.849 | 0.5 | 20.0 | 14.0 | 8.0 | 6 |
| 82 | 4.315 | 3.096 | 2.899 | 2.323 | 1.424 | 0.735 | 0.4 | 20.0 | 14.0 | 8.0 | 6 |
| 81 | 4.412 | 3.112 | 2.878 | 2.354 | 1.423 | 0.751 | 0.4 | 20.0 | 14.0 | 8.0 | 6 |
| 80 | 4.422 | 3.144 | 2.891 | 2.331 | 1.391 | 0.713 | 0.4 | 20.0 | 14.0 | 8.0 | 6 |
| 79 | 6.090 | 4.513 | 3.960 | 3.097 | 1.786 | 0.862 | 0.5 | 20.0 | 14.0 | 8.0 | 6 |
| 78 | 6.634 | 4.880 | 4.202 | 3.364 | 1.976 | 0.970 | 0.6 | 20.0 | 14.0 | 8.0 | 6 |
| 77 | 6.411 | 4.786 | 4.083 | 3.251 | 1.897 | 0.904 | 0.5 | 20.0 | 14.0 | 8.0 | 6 |
| 76 | 7.851 | 5.933 | 4.988 | 3.868 | 2.161 | 1.019 | 0.6 | 20.0 | 14.0 | 8.0 | 6 |
| 75 | 8.689 | 6.566 | 5.439 | 4.220 | 2.255 | 1.037 | 0.6 | 20.0 | 14.0 | 8.0 | 6 |
| 74 | 11.031 | 8.492 | 6.856 | 5.216 | 2.663 | 1.193 | 0.7 | 20.0 | 14.0 | 8.0 | 6 |
| 73 | 12.525 | 9.295 | 7.214 | 5.835 | 2.950 | 1.337 | 0.7 | 20.0 | 14.0 | 8.0 | 6 |
| 72 | 11.844 | 9.037 | 7.254 | 5.784 | 2.490 | 1.113 | 0.6 | 20.0 | 14.0 | 8.0 | 6 |
| 71 | 17.894 | 14.384 | 11.493 | 8.569 | 3.102 | 1.467 | 0.8 | 20.0 | 14.0 | 8.0 | 6 |
| 70 | 14.353 | 10.930 | 8.567 | 6.798 | 2.870 | 1.285 | 0.7 | 20.0 | 14.0 | 8.0 | 6 |

|      | -4/0.1 | -4/0.2 | -4/0.333 | -4/0.5 | -4/1.0 | -4/1.5 | -4/2.0 | -4/0.1 | -4/0.2 | -4/0.5 |
|------|--------|--------|----------|--------|--------|--------|--------|--------|--------|--------|
| -4 Spec | 42 | 30 |  | 13 |  |  |  | Spec | Spec | Spec |
| 100 | 18.2 | 11.3 | 12.6 | 13.2 | 6.9 | 3.2 | 1.6 | 42.0 | 30.0 | 13.0 |
| 99  | 18.0 | 11.2 | 12.4 | 12.9 | 6.9 | 3.3 | 1.7 | 42.0 | 30.0 | 13.0 |
| 98  | 18.7 | 11.6 | 12.9 | 13.4 | 7.1 | 3.4 | 1.7 | 42.0 | 30.0 | 13.0 |
| 97  | 18.8 | 11.6 | 12.9 | 13.3 | 6.9 | 3.2 | 1.7 | 42.0 | 30.0 | 13.0 |
| 96  | 18.5 | 11.5 | 12.7 | 13.1 | 6.9 | 3.2 | 1.7 | 42.0 | 30.0 | 13.0 |
| 95  | 17.7 | 11.0 | 12.1 | 12.6 | 6.7 | 3.1 | 1.6 | 42.0 | 30.0 | 13.0 |
| 94  | 17.8 | 11.0 | 12.1 | 12.4 | 6.3 | 2.9 | 1.6 | 42.0 | 30.0 | 13.0 |
| 93  | 18.6 | 11.5 | 12.6 | 13.0 | 6.7 | 3.1 | 1.6 | 42.0 | 30.0 | 13.0 |
| 92  | 20.9 | 12.8 | 13.9 | 14.5 | 7.2 | 3.3 | 1.7 | 42.0 | 30.0 | 13.0 |
| 91  | 20.0 | 12.3 | 13.3 | 13.8 | 7.0 | 3.2 | 1.6 | 42.0 | 30.0 | 13.0 |
| 90  | 20.3 | 12.6 | 13.5 | 13.9 | 6.9 | 3.2 | 1.7 | 42.0 | 30.0 | 13.0 |
| 89  | 22.1 | 13.6 | 14.2 | 14.8 | 7.2 | 3.4 | 1.8 | 42.0 | 30.0 | 13.0 |
| 88  | 22.1 | 13.6 | 14.3 | 14.8 | 7.3 | 3.4 | 1.8 | 42.0 | 30.0 | 13.0 |
| 87  | 22.0 | 13.5 | 14.1 | 14.7 | 7.0 | 3.2 | 1.7 | 42.0 | 30.0 | 13.0 |
| 86  | 21.7 | 13.1 | 14.0 | 14.4 | 6.8 | 3.1 | 1.6 | 42.0 | 30.0 | 13.0 |
| 85  | 21.2 | 12.8 | 13.6 | 14.0 | 6.7 | 3.0 | 1.5 | 42.0 | 30.0 | 13.0 |
| 84  | 20.8 | 12.6 | 13.4 | 13.7 | 6.5 | 2.9 | 1.5 | 42.0 | 30.0 | 13.0 |
| 83  | 20.3 | 12.3 | 13.1 | 13.4 | 6.2 | 2.8 | 1.5 | 42.0 | 30.0 | 13.0 |
| 82  | 21.1 | 12.9 | 13.6 | 13.8 | 6.6 | 3.0 | 1.6 | 42.0 | 30.0 | 13.0 |
| 81  | 20.9 | 12.6 | 13.2 | 13.5 | 6.2 | 2.8 | 1.4 | 42.0 | 30.0 | 13.0 |
| 80  | 23.2 | 14.0 | 14.5 | 14.7 | 6.7 | 2.9 | 1.5 | 42.0 | 30.0 | 13.0 |
| 79  | 27.1 | 16.3 | 16.3 | 16.6 | 7.0 | 2.9 | 1.5 | 42.0 | 30.0 | 13.0 |
| 78  | 27.9 | 16.8 | 16.7 | 16.9 | 7.0 | 2.8 | 1.4 | 42.0 | 30.0 | 13.0 |
| 77  | 27.4 | 16.5 | 16.4 | 16.7 | 6.9 | 2.8 | 1.4 | 42.0 | 30.0 | 13.0 |
| 76  | 32.8 | 19.8 | 19.0 | 19.3 | 7.6 | 3.1 | 1.6 | 42.0 | 30.0 | 13.0 |
| 75  | 35.8 | 21.6 | 20.4 | 20.7 | 8.0 | 3.2 | 1.6 | 42.0 | 30.0 | 13.0 |
| 74  | 42.9 | 26.0 | 23.2 | 23.9 | 8.5 | 3.3 | 1.7 | 42.0 | 30.0 | 13.0 |
| 73  | 40.2 | 24.7 | 21.8 | 22.3 | 8.0 | 3.1 | 1.6 | 42.0 | 30.0 | 13.0 |
| 72  | 54.9 | 33.6 | 28.4 | 29.5 | 9.4 | 3.5 | 1.8 | 42.0 | 30.0 | 13.0 |
| 71  | 81.5 | 49.6 | 40.1 | 42.1 | 11.4 | 4.0 | 2.0 | 42.0 | 30.0 | 13.0 |
| 70  | 86.5 | 52.4 | 42.6 | 44.5 | 11.8 | 4.0 | 2.0 | 42.0 | 30.0 | 13.0 |

FIG. 15

RETROREFLECTIVE SHEETING HAVING A HALFTONE PRINTED FRONT SURFACE

CROSS-REFERENCE TO RELATED APPLICATION

The present application claims the benefit of U.S. Provisional Application No. 61/548,777 filed Oct. 19, 2011, which is incorporated herein in its entirety.

BACKGROUND OF THE INVENTION

This invention generally relates to retroreflective sheeting having a printed top surface, and is specifically concerned with a retroreflective sheeting having a top surface printed in a halftone pattern that is capable of displaying printed information with higher reflectivity without the need for a topcoat or an overlaminate film.

Retroreflective sheeting is often used in the manufacture of road signs due to its relatively high degree of reflectivity. Such sheeting typically includes a back side that includes a pattern of retroreflective elements in the form of prisms or glass beads, and a flat, front side. For road sign applications, it is often necessary for the sheeting to display both printed information in the form of letters and numbers, as well as background colors (i.e. red for stop signs, yellow for yield signs, and blue or green for highway exit signs). Consequently, a layer of light-transmissive, colored ink is printed over the flat front side of the sheeting in all areas where the background color is desired.

While such a printing technique is capable of producing functional retroreflective signage, the overall reflectivity of the sign is undesirably compromised due to two factors. First, even when the most light-transmissive inks are used, some amount of the incident and retroreflected light is necessarily absorbed by the ink. Secondly, the printed layer of transmissive ink creates surface imperfections in the flat front surface of the sheeting by roughing the surface, which in turn scatters both the incident and the reflected light. The surface roughness is a consistently observed side effect of most digital printing technologies, such as, ink-jet printing utilizing solvent, ultraviolet (UV) or LaTex inks. In other comparable technologies such as thermal transfer ribbon printing, these surface imperfections can be better controlled. Such scattering reduces the amount of light that is retroreflected back from the sign toward, for example, the headlights of an automobile thereby dimming the appearance of the sign to the driver. In the past, the scattering-type retroreflectivity losses have been partially restored by the application of a clear topcoat or an overlaminate film over the printed top surface of the sheeting. Such a clear film rectifies both the incident and the retroreflected light as it is transmitted through the layer of ink, thereby reducing scattering and increasing the retroreflectivity of the sheeting. However, the application of such a clear topcoat or an overlaminate film over the printed top surface of the sheeting increases the time and cost associated with the manufacture of the final sign. It also amounts to another layer of transparent material which could potentially absorb and/or block portions of incident and retroreflected light.

SUMMARY OF THE INVENTION

The invention increases the reflectivity of the final printed retroreflective sheet material while obviating the need for a clear topcoat or film. To these ends, the invention comprises a retroreflective film having a planar surface on a front side and a plurality of retroreflective elements on a back side, and an ink layer deposited on said planar surface in a half-tone pattern formed from uniformly space, discrete areas (or "dots") of deposited ink. The areas between the dots provide light-transmissive openings that receive incident light and transmit retroreflected light without absorption or scattering from the ink.

While the discrete areas of deposited ink of the half-tone pattern may cover between about 50% and 99% of the area of the half-tone pattern on the planar surface, these areas preferably cover between about 60% and 90% of the area of the half-tone pattern on the planar surface, and more preferably between about 60% and 80% of this area.

The shape of the uniformly spaced-apart discrete areas or dots of deposited ink forming the half-tone pattern may be virtually any symmetrical shape such as circles, squares, triangles, diamonds, or lines arranged in parallel or in a grid. The size of the discrete areas of ink should be small enough so that the halftone pattern appears to be of a single color or shade to the unaided eye. The retroreflective elements may be either prisms such as cube corners, or glass beads.

Because the use of such a halftone pattern of ink obviates the need for a clear topcoat or film over the front surface of the retroreflective sheet to reduce scattering, the top surface of the sheeting preferably (but not necessarily) consists of only the printed or deposited layer of ink.

BRIEF DESCRIPTION OF THE DRAWINGS

FIG. 9 is a table of the data used in generating the graph of FIG. 8;

FIG. 11 is a table of the data used in generating the graph of FIG. 10;

FIG. 13 is a table of the data used in generating the graph of FIG. 12;

FIG. 15 is a table of the data used in generating the graph of FIG. 14.

DETAILED DESCRIPTION OF THE INVENTION

Figure 1A:
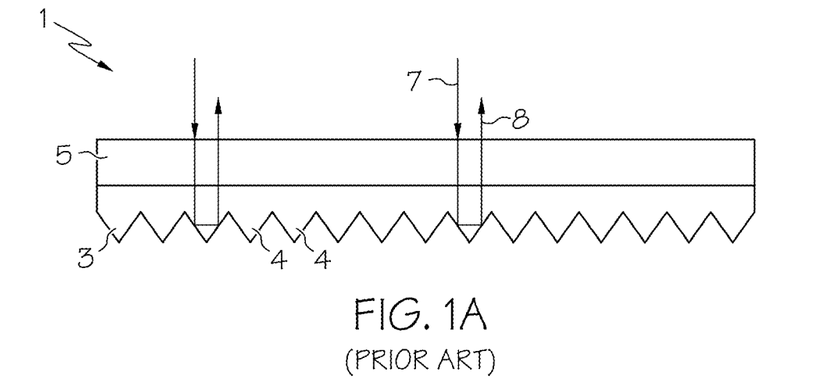
FIGS. 1A and 1B are side schematic views of a prior art prismatic retroreflective film with no printed ink layer and with the combination of an ink layer and a clear coat, respectively.
Figure 1B:
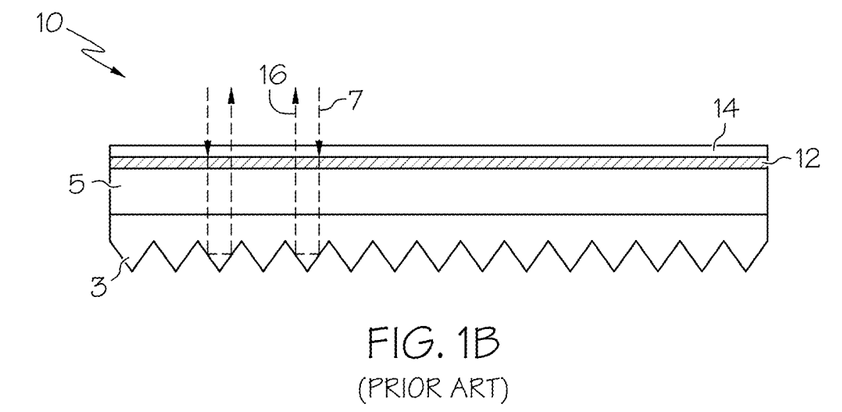

The invention and its advantages may be most easily understood by a direct comparison with the prior art retroreflective sheeting illustrated in FIGS. 1A and 1B.

FIG. 1A is a side schematic views of a prior art prismatic retroreflective sheeting 1 with no printed ink layer. Such sheeting 1 comprises an array 3 of retroreflective elements. In this example, the retroreflective elements are prismatic cube corners 4, but they could be prismatic elements of any shape or spherical glass beads. A transparent substrate 5 overlies the array 3 of prismatic cube corners 4. Both the array of prismatic cube corners 4 and substrate 5 are typically formed from a transparent plastic material such as polyvinyl chloride, polyester, polyurethane, polymethyl methacrylate or polycarbonate. In use, incoming light beams 7 from, for example, the headlights of an automobile enter the transparent substrate 5 and impinge on the walls of the prismatic cube corners 4. The angle of the cube corner walls and index of refraction of the transparent material forming the prismatic cube corners 4 are chosen such that incoming light beams that impinge upon the surface of the sheeting within a certain entrance angle are retroreflected back toward their source. In the case of the prior art sheeting 1, the observed brightness of the retroreflected beams 8 is substantially the same as the brightness of the incoming light beams 7 as relatively little light is absorbed or scattered by the transparent material forming the prismatic cube corners 4 and substrate 5. Consequently, such sheeting 1 retroreflects a relatively high percentage of the incoming light.

FIG. 1B is a side schematic views of a prior art prismatic retroreflective sheeting 10 having an ink layer 12 of light-transmissive ink, which may be applied manually via screen printing or digitally via ink jet or thermal transfer ribbon. In the case of road signage, red, brown, green or blue ink is typically used in the ink layer 12 to provide a contrasting background for numbers or letters. A clear topcoat or laminate film 14 is applied over the ink layer 12 in order to reduce light losses caused by the roughness of the ink layer 12 and the consequent scattering of light beams away from the desired pattern of retroreflectivity. In use, incoming light beams 7 impinge on the surface of the topcoat 14, and through the layer of transmissive ink 12 and the substrate 5. From there, the light beams are retroreflected by the array 3 of prismatic cube corners 4 (missing in the diagram 1B) and are retransmitted through the substrate 5, ink layer 12 and topcoat 14. However, the emerging light beams 16 are substantially diminished in brightness due to the color of the ink layer 12 and the consequent absorption of other colors of light, the thickness of the ink layer 12, the transmissivity of the ink layer 14, and the surface finish of the ink in the layer 14. The necessity of applying the clear topcoat or laminate film 14 increases the overall cost and processing time of the sheeting 10 and does not completely solve the light losses caused by the roughness of the ink layer 14. Consequently, the overall reflectivity of the resulting sheeting 10 may fall below the specifications set by federal, state and local governments.

Figure 2:
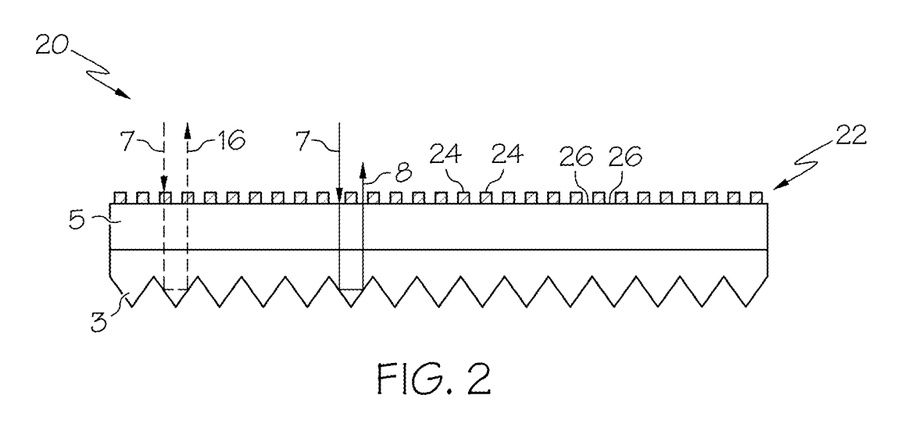
FIG. 2 is a side schematic view of the retroreflective film of the invention which includes a halftone printed pattern of ink over its front surface.

FIG. 2 is a side schematic view of the halftone retroreflective sheeting 20 of the invention. Sheeting 20 includes a halftone ink layer 22 formed from a pattern of discrete areas 24 of deposited ink (hereinafter generally referred to as "ink dots") and open areas 26 where ink is not present. In use, some of the incoming light beams 7 impinge upon the discrete areas 24 of deposited ink 22 and emerge as light beams 16 substantially diminished in brightness due to the color of the ink layer 12 and the consequent absorption and scattering of other colors of light. However, others of these light beams 7 impinge upon and are reflected through the open areas 26 of the halftone ink layer 22 where ink is not present, and emerge as retroreflected light beams 8 that are substantially undiminished in brightness, which increase the overall reflectivity of the sheeting 20 over the prior art printed sheeting 10. Advantageously, the applicant has observed that the provision of open areas 26 in the halftone ink layer more than offsets the light losses caused by the surface roughness of the printed ink dots 24, thereby obviating the need for the clear topcoat or laminate film 14 used in the prior art printed sheeting 10. Additionally, the overall increase in the reflectivity of the sheeting 20 insures that such sheeting can meet or exceed the reflectivity, day time and night time color specifications set by federal, state and local governments.

Figure 3A:
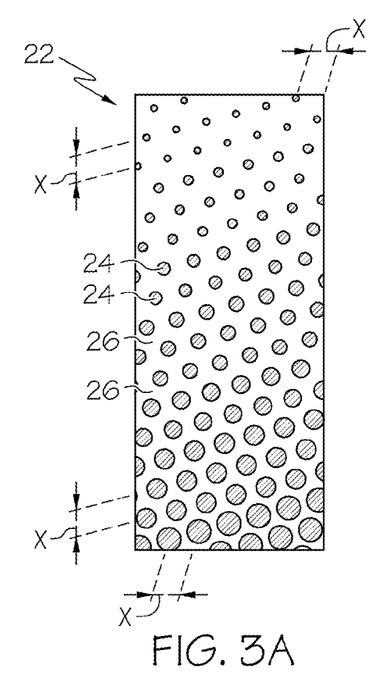
FIGS. 3A and 3B illustrate an enlarged plan view of the halftone layer of ink on the sheeting of FIG. 2 and an unenlarged plan view of this halftone layer of ink, respectively.
Figure 3B:
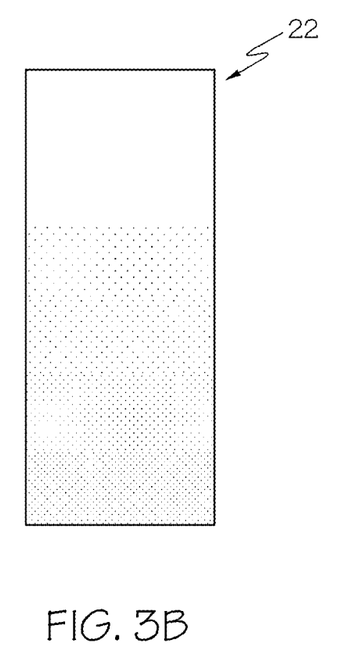

FIG. 3A is an enlarged plan view of the halftone layer of ink 22 on the sheeting of FIG. 2, illustrating the pattern of ink dots 24 and the open spaces 26 forming this layer 22. While the dots 24 in FIG. 3A are circular, and arranged in a pattern such that the centers of the dots are uniformly spaced apart a distance "x", virtually any geometrical shape for the dots may be used so long as the resulting pattern is uniform and symmetrical. In road sign applications, the ink dots 24 will likely all be the same size to create the appearance of a uniform background color. However, the halftone layer of ink 22 may also be formed from a pattern of ink dots 24 having diminishing or increasing sizes in one or more directions to create the appearance of a shaded color to an observer standing some distance from the sheeting 20, as is illustrated in FIG. 3B. Preferably, the diameters and coverage of the ink dots 24 are selected so that the largest individual ink dots 24 cannot be perceived by an observer positioned at an expected observation point from the sheeting. The use of the largest possible dots to achieve the desired halftone effect advantageously simplifies the process of printing the dots on the sheeting 20. In the case of road signs, the typical observer in automobile may not get any closer than perhaps 15 feet from the sign, and so the diameter of the dots 24 may be as large as 1.0 millimeter without imposing any perceptible "graininess" to the either the uniform or shaded coloration that the halftone layer of ink 22 provides on the sheeting 20. Such ink dots 24 may be applied via well known printing techniques (i.e. manually via screen printing or digitally via ink jet or thermal transfer ribbon).

Figure 4A:
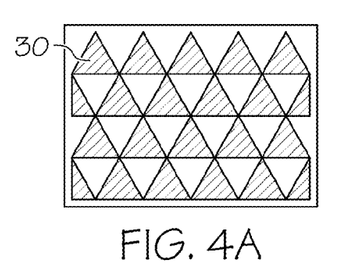
FIGS. 4A, 4B, 4C and 4D illustrate four different geometrical shapes that the dots used in the halftone layer of ink may take.
Figure 4B:
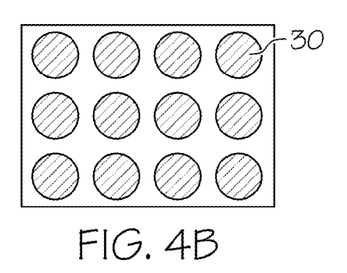

FIGS. 4A, 4B, 4C and 4D illustrate some of the various shapes that the ink dots 24 may assume, which includes without limitation triangles 30, squares or rectangles 32, or circles 34, 36 of various sizes. FIG. 4A shows sheeting with a pattern of triangle ink dots, elements or patterns 30. FIG.

Figure 4C:
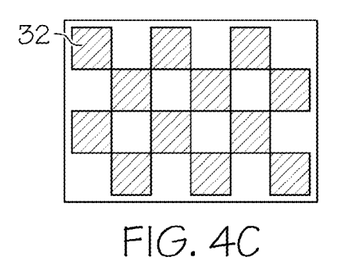
Figure 4D:
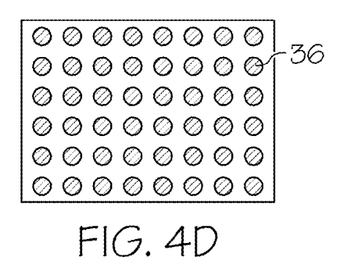
Figure 5:
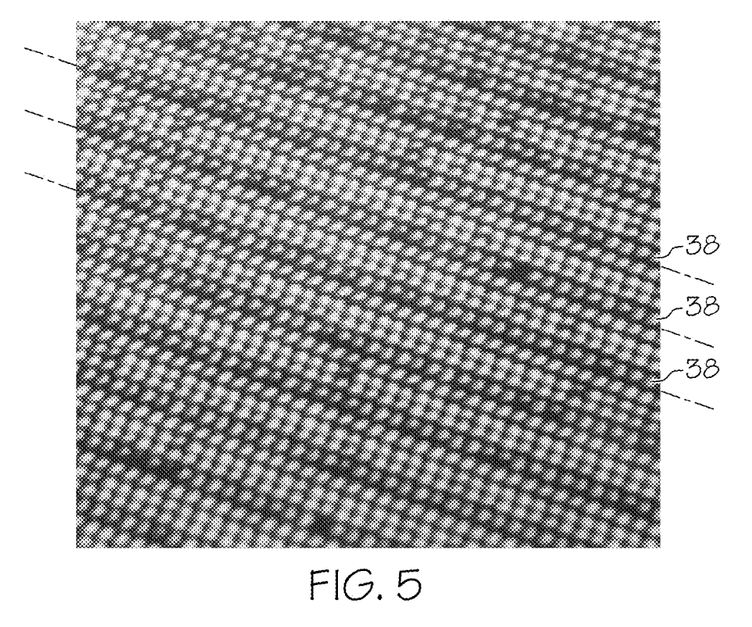
FIG. 5 is an enlarged view of an embodiment of the inventive sheeting wherein the halftone ink layer is formed from parallel lines of ink deposited over a retroreflective material employing glass beads.

4B shows sheeting with a pattern of circle ink dots, patterns or elements 34. FIG. 4C shows sheeting with a pattern of square ink dots, patterns or elements 32. FIG. 4D shows sheeting with a pattern of smaller circle ink dots, elements or patterns 36. Other shapes and sizes are of course possible, depending on the preference of the end user or manufacturing capability. Additionally, as is illustrated in FIG. 5, the ink dots 24 may assume the form of thin parallel stripes 38 that are either uniformly spaced if a uniform color is desired, or spaced apart at different distances if a shaded color is desired. While the ink dots 24 are illustrated as being of the same color ink in FIGS. 3A, 3B and FIGS. 4A-4D, different dots, patterns or elements may be printed in different colors of ink in order to create a halftone layer of ink 22 that displays multi-colored images.

Figure 6:
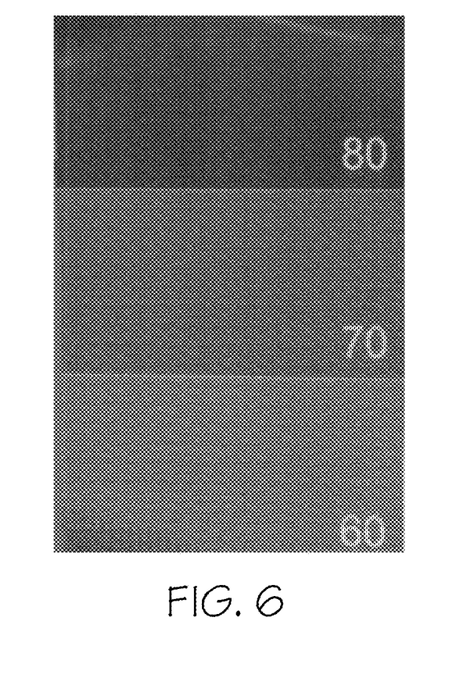
FIG. 6 illustrates the relative brightness of sheet material having a halftone layer of ink that covers 80%, 70% and 60% of the halftone area, respectively.

The amount of increase in reflectivity may be adjusted by controlling the aggregate area of the ink dots, elements or patterns 24 relative to the area of the front face of the sheeting 20. FIG. 6 illustrates the relative brightness of sheet material having a halftone layer of ink that covers 80%, 70% and 60% of the halftone area, respectively. Of course an appropriate balance needs to be achieved to get the desired reflectivity and to pass color specifications. When the aggregate area of the ink dots 24 relative to the area of the front face of the sheeting 20 is too low, the sheeting 20 will lose its color, and when this ratio is too high, the sheeting will lose its retroreflectivity boost. As will be discussed in more detail hereinafter, the applicant has found that such an appropriate balance is achieved when the aggregate area of the ink dots 24 relative to the area of the front face of the sheeting 20 is between about 60% and 90%.

Figure 7:
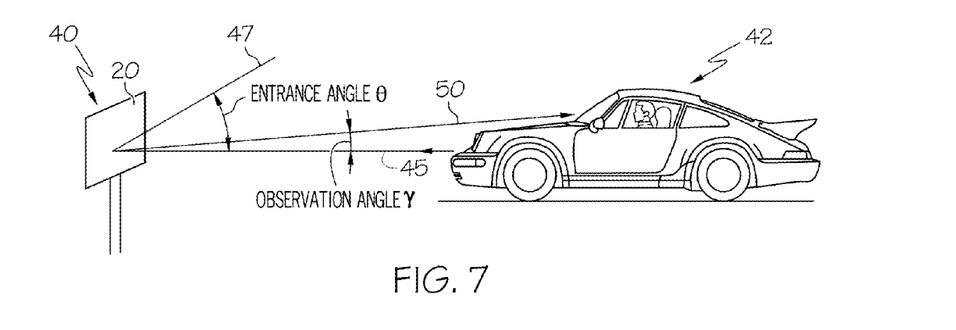
FIG. 7 is a perspective diagram showing the application of the invention and the definition of the angle of incidence and the angle of observation.

FIG. 7 is useful in understanding the reflectivity test results illustrated in FIGS. 8-15. In particular, FIG. 7 illustrates the various parameters used to measure the reflectivity of a halftone printed sheeting 20 used on a road sign 40 as observed by the driver 42 of an automobile. Light beams 45 from the headlights of the automobile impinge on the halftone printed sheeting 20 as shown. If the surface of the sheeting 20 was a simple mirror, these light beams would reflect off of the sheeting along the dotted line 47. The angle between the incident light beams 45 and the dotted line 47 where these beams would go if the sheeting 20 were a specular reflector is referred to "entrance angle θ" in the drawing, and is equal to the sum of the angle of incidence and the angle of reflection. However, because the sheeting 20 is retroreflective, the incident light beams 45 are not reflected along the line 45 but instead are retroreflected back along a narrow cone in the direction of their sources, which in this case are the automobile headlights. Because the eyes of the driver of the automobile are not aligned with a center axis of the headlights, but instead are vertically displaced a few feet over the headlights, he sees the retroreflected light beams 50 at an angle, referred to as the "observation angle γ" in the drawing. Ideally, retroreflective sheeting used on a road sign 40 should be highly reflective when the automobile is far away from the sign 40 and the entrance angle θ is small as well as when the automobile is close to the sign and the entrance angle θ is large. High reflectivity when the sign is far away and the entrance angle θ is small alerts the driver of the presence of the sign, while high reflectivity when the automobile is close and the entrance angle θ is large allows the driver to easily read the information on the sign. For the same reasons, retroreflective sheeting used on a road sign 40 should be highly reflective when the automobile is far away from the sign 40 and the observation angle γ is small as well as when the automobile is close to the sign and the observation angle γ is large. Consequently, when evaluating the reflectivity of retroreflective sheeting used for road sign applications, the reflectivity of the sheeting measured both at a relatively large entrance angle of 30° and relatively small entrance angle of −4°. Additionally, for both the 30° and −4° entrance angles, the reflectivity is measured for small, moderate and large observation angles of 0.1°, 0.2° and 0.5°.

Figure 8:
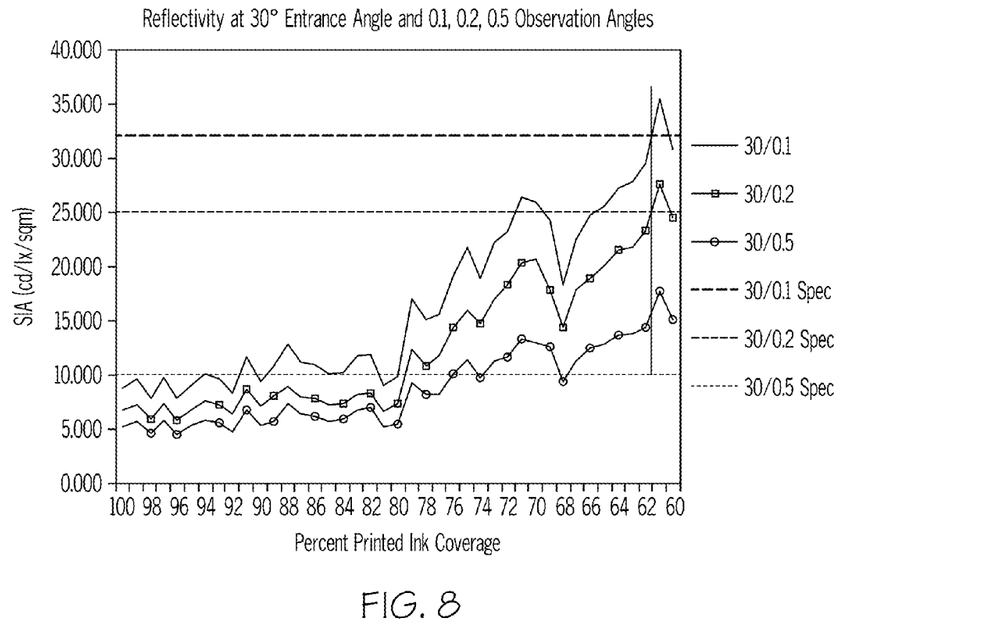
FIG. 8 is a graph illustrating the reflectivity of the retroreflective sheet material of the invention when a halftone layer of green ink is used at coverages of between 100% and 60% at a 30° entrance angle and observation angles of 0.1°, 0.2° and 0.5°, respectively.

FIG. 8 illustrates the reflectivity of the printed halftone retroreflective sheet material 20 of the invention when a halftone layer of green ink is used for a 30° entrance angle at observation angles of 0.1°, 0.2° and 0.5° (which correspond to the solid line upper graph, the solid line with squares middle graph, and the solid line with circles lower graph, respectively). The horizontal or x axis of these graphs is the percent coverage of ink from full coverage, 100%, to partial coverage of 60%. The vertical or y axis is the SIA-measured reflectivity; i.e. reflectivity measured in candelas per lux per meter squared (cd/lx/sqm). It should be noted that the units on y-axis of FIGS. 8, 10, 12 and 14 are scaled to the measured values set forth in the tables of FIGS. 9, 11, 13 and 15; hence the graphs of FIGS. 8, 10, 12 and 14 have different numbers. The lower, middle and upper horizontal dotted lines on the graph of FIG. 8 are the minimum reflectivity specifications for the sheeting 20 to pass for observation angles of 0.5°, 0.2° and 0.1° respectively. Accordingly, as indicated by the solid vertical line on the graph, the reflectivity of the halftone printed sheeting 20 of the invention equals or exceeds all specifications when the percentage of the front surface of the sheeting covered by ink falls to approximately 62%.

FIG. 9 is a table of the data used in generating the graph of FIG. 8 illustrating the reflectivity of the retroreflective sheet material of the invention when a halftone layer of green ink is used at coverages of between 100% and 60% at a 30° entrance angle and observation angles of 0.1°, 0.2° and 0.5°, respectively.

Figure 10:
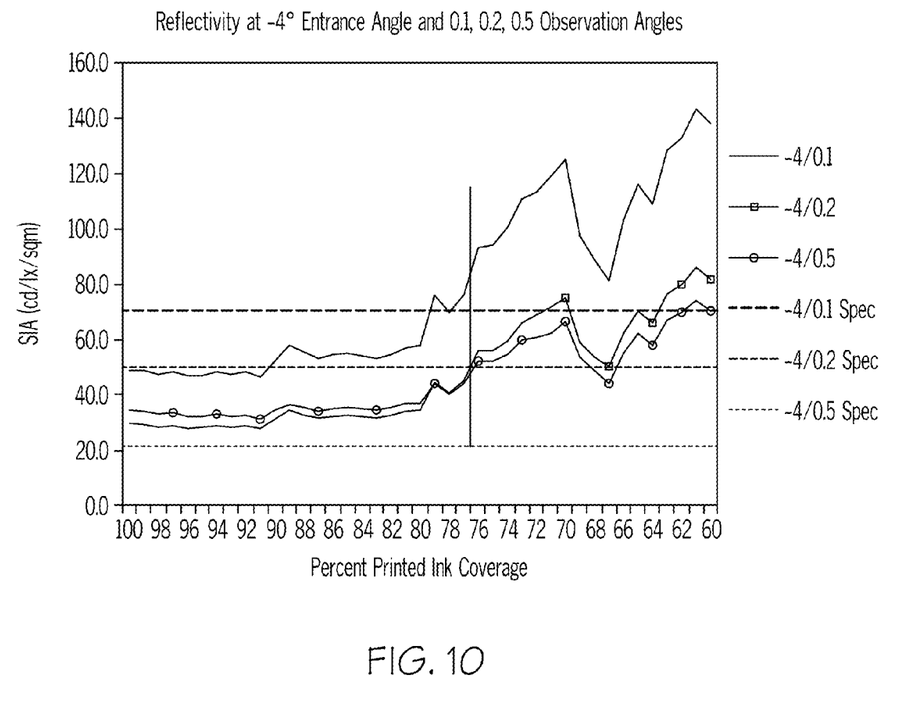
FIG. 10 is a graph illustrating the reflectivity of the retroreflective sheet material of the invention when a halftone layer of green ink is used at coverages of between 100% and 60% at a −4.0° entrance angle and observation angles of 0.1°, 0.2° and 0.5°, respectively.

FIG. 10 illustrates the reflectivity of the printed halftone retroreflective sheet material 20 of the invention when a halftone layer of green ink is used for a −4° entrance angle at observation angles of 0.1°, 0.2° and 0.5° (which correspond to the solid line upper graph, the solid line with squares middle graph, and the solid line with circles lower graph, respectively). Again, the horizontal or x axis of these graphs is the percent coverage of ink from full coverage, 100%, to partial coverage of 60%. The vertical or y axis is the SIA-measured reflectivity; i.e. reflectivity measured in candelas per lux per meter squared (cd/lx/sqm). Again, the lower, middle and upper horizontal dotted lines on the graph are the minimum reflectivity specifications for the sheeting 20 to pass for observation angles of 0.5°, 0.2° and 0.1° respectively. As indicated by the solid vertical line on the graph, the reflectivity of the halftone printed sheeting 20 of the invention equals or exceeds all specifications when the percentage of the front surface of the sheeting covered by ink falls to approximately 76%.

FIG. 11 is a table of the data used in generating the graph of FIG. 10 illustrating the reflectivity of the retroreflective sheet material of the invention when a halftone layer of green ink is used at coverages of between 100% and 60% at a −4° entrance angle and observation angles of 0.1°, 0.2° and 0.5°, respectively.

Figure 12:
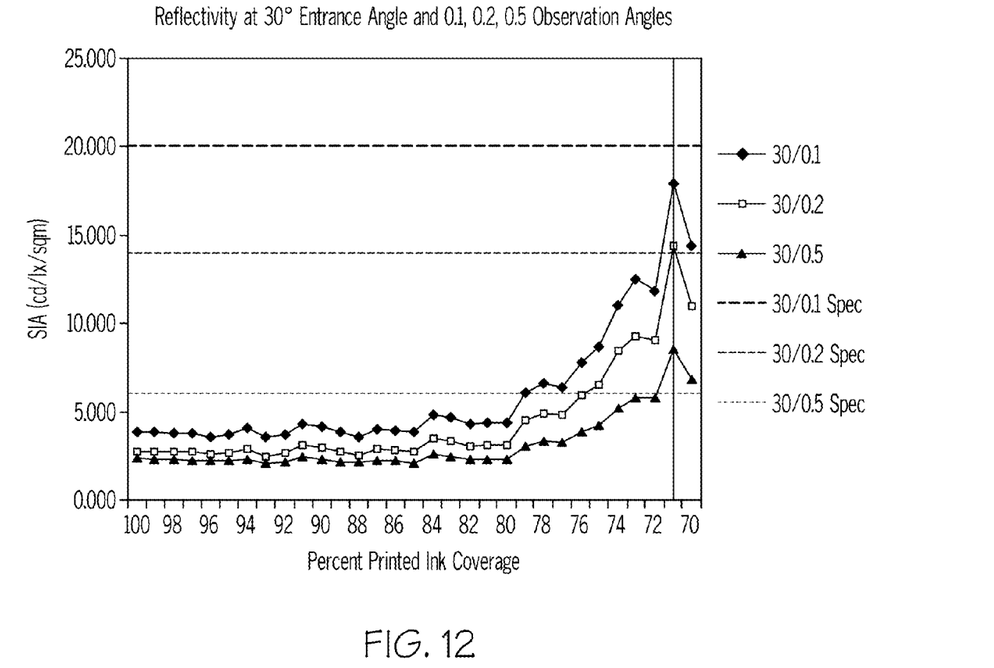
FIG. 12 is a graph illustrating the reflectivity of the retroreflective sheet material of the invention when a halftone layer of blue ink is used at coverages of between 100% and 70% at a 30° entrance angle and observation angles of 0.1°, 0.2° and 0.5°, respectively.

FIG. 12, like FIG. 8, illustrates the reflectivity of the printed halftone retroreflective sheet material 20 of the invention for a 30° entrance angle at observation angles of 0.1°, 0.2° and 0.5°, the only difference being that a halftone layer of blue ink instead of green ink was used. As indicated by the solid vertical line in the graph of FIG. 12, the reflectivity of the halftone printed sheeting 20 of the invention equals or exceeds all specifications when the percentage of the front surface of the sheeting covered by ink falls to approximately 71%.

FIG. 13 is a table of the data used in generating the graph of FIG. 12 illustrating the reflectivity of the retroreflective sheet material of the invention when a halftone layer of blue ink is used at coverages of between 100% and 70% at a 30° entrance angle and observation angles of 0.1°, 0.2° and 0.5°, respectively.

Figure 14:
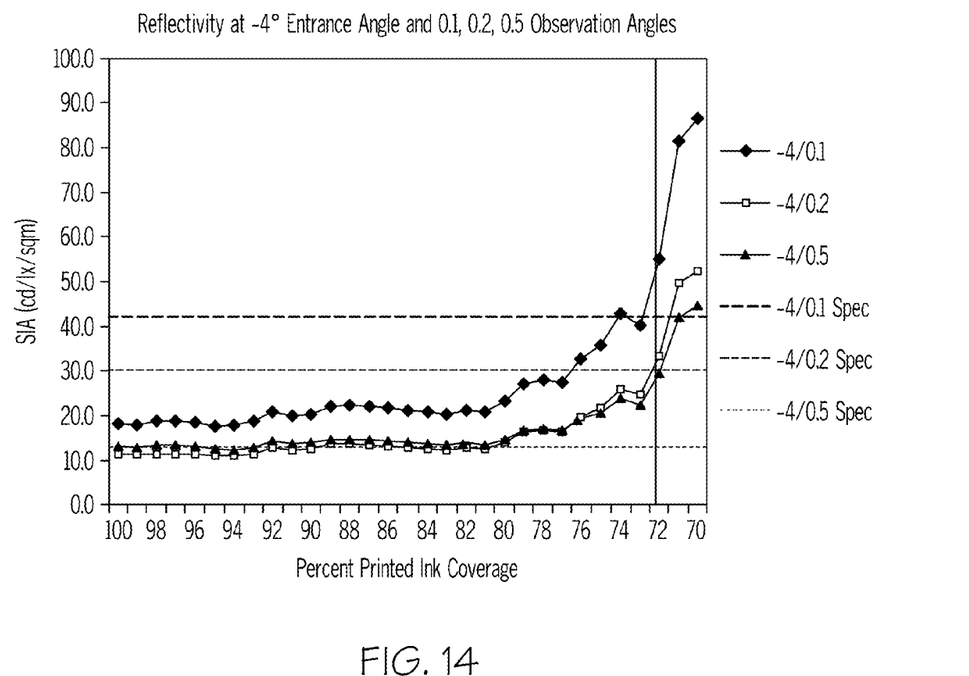
FIG. 14 is a graph illustrating the reflectivity of the retroreflective sheet material of the invention when a halftone layer of blue ink is used at coverages of between 100% and 60% at a −4.0° entrance angle and observation angles of 0.1°, 0.2° and 0.5°, respectively.

Finally, FIG. 14, like FIG. 10, illustrates the reflectivity of the printed halftone retroreflective sheet material 20 of the invention for a −4° entrance angle at observation angles of 0.1°, 0.2° and 0.5°, the only difference being that a halftone layer of blue ink instead of green ink was used. As indicated by the solid vertical line in the graph of FIG. 14, the reflectivity of the halftone printed sheeting 20 of the invention equals or exceeds all specifications when the percentage of the front surface of the sheeting covered by ink falls to approximately 72%.

FIG. 15 is a table of the data used in generating the graph of FIG. 14 illustrating the reflectivity of the retroreflective sheet material of the invention when a halftone layer of blue ink is used at coverages of between 100% and 70% at a −40° entrance angle and observation angles of 0.1°, 0.2° and 0.5°, respectively.

The foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. Retroreflective sheeting, comprising:
   a retroreflective film having a planar surface on a front side and a plurality of retroreflective elements on a back side, and
   an ink layer deposited on said planar surface in a half-tone pattern that includes a pattern of light-transmissive openings between discrete areas of deposited ink that receives incident light and transmits retroreflected light without interference from said ink;
   wherein the light-transmissive openings and discrete areas of deposited ink define a front, outermost surface of the retroreflective sheeting.

2. The retroflective sheeting of claim 1, wherein the discrete areas of deposited ink of the half-tone pattern cover between about 50% and 99% of the area of the half-tone pattern on the planar surface.

3. The retroflective sheeting of claim 1, wherein the discrete areas of deposited ink of the half tone pattern cover between about 60% and 80% of the area of the half-tone pattern on the planar surface.

4. The retroflective sheeting of claim 3, wherein the shape of each of the discrete areas of deposited ink of the half-tone pattern is one or more of the group consisting of circles, squares, triangles, diamonds, lines and wire grid.

5. The retroflective sheeting of claim 1, wherein the discrete areas of deposited ink of the half-tone pattern are uniformly spaced apart.

6. The retroflective sheeting of claim 1, wherein the sizes of the discrete areas of deposited ink of the half-tone pattern change along at least one direction so that the perceived ink layer provides different shades of a color.

7. The retroflective sheeting of claim 1, wherein different discrete areas of deposited ink of the half-tone pattern are different colors.

8. The retroflective sheeting of claim 1, wherein the ink is partially transmissive of light such that retroreflected light from said film includes light transmitted through said ink in addition to light transmitted through said openings.

9. The retroflective sheeting of claim 1, wherein the retroreflective elements are prisms.

10. The retroflective sheeting of claim 9, wherein the prisms are cube corners.

11. The retroflective sheeting of claim 1, wherein the retroreflective elements are beads.

12. The retroflective sheeting of claim 1, wherein a front surface of said film consists of said ink layer.

13. The retroflective sheeting of claim 1, wherein the half-tone pattern is symmetrical.

14. The retroflective sheeting of claim 1, where in the discrete areas of deposited ink are printed using a printing technique.

15. The retroflective sheeting of claim 14, wherein the printing technique includes one of the group of screen printing, ink jet or thermal transfer ribbon.

16. Retroreflective sheeting, comprising:
    a retroreflective film having a planar surface on a front side and a plurality of retroreflective elements on a back side, and
    an ink layer deposited on said planar surface in a half-tone pattern that includes a pattern of light-transmissive openings between discrete areas of deposited ink that receives incident light and transmits retroreflected light without interference from said ink,
    wherein the ink is partially transmissive of light such that retroreflected light from said film includes light transmitted through said ink in addition to light transmitted through said openings, and the discrete areas of deposited ink of the half-tone pattern cover between about 60% and 80% of the area of the half-tone pattern on the planar surface;
    wherein the light-transmissive openings and discrete areas of deposited ink define a front, outermost surface of the retroreflective sheeting; and
    wherein the front, outermost surface of said film consists of said ink layer.

17. The retroflective sheeting of claim 16, wherein the discrete areas of deposited ink of the half-tone pattern are uniformly spaced apart.

18. The retroflective sheeting of claim 17, wherein the shape of each of the discrete areas of deposited ink of the half-tone pattern is one of the group consisting of circles, squares, triangles, diamonds, lines and wire grid.

19. The retroflective sheeting of claim 16, wherein the retroreflective elements are one of prisms and beads.

20. The retroflective sheeting of claim 19, wherein the prisms are cube corners.

21. Retroreflective sheeting, consisting of:
    a retroreflective film having a planar surface on a front side and a plurality of retroreflective elements on a back side, and an ink layer deposited on said planar surface in a half-tone pattern that includes a pattern of light-transmissive openings between discrete areas of deposited ink that receives incident light and transmits retroreflected light without interference from said ink,
wherein the light-transmissive openings and discrete areas of deposited ink define a front, outermost surface of the retroreflective sheeting.

\* \* \* \* \*